United States Patent
Li et al.

(10) Patent No.: US 10,931,027 B2
(45) Date of Patent: Feb. 23, 2021

(54) METHOD FOR ARRAY ELEMENTS ARRANGEMENT OF L-SHAPED ARRAY ANTENNA BASED ON INHERITANCE OF ACQUIRED CHARACTER

(71) Applicants: Dongguan University of Technology, Guangdong (CN); Yun Li, Guangdong (CN); Lin Li, Guangdong (CN)

(72) Inventors: Yun Li, Guangdong (CN); Lin Li, Guangdong (CN)

(73) Assignees: Dongguan University of Technology, Guangdong (CN); Yun Li, Guangdong (CN); Lin Li, Guangdong (CN)

( * ) Notice: Subject to any disclaimer, the term of this patent is extended or adjusted under 35 U.S.C. 154(b) by 208 days.

(21) Appl. No.: 16/335,673

(22) PCT Filed: Feb. 2, 2018

(86) PCT No.: PCT/CN2018/075150
§ 371 (c)(1),
(2) Date: Mar. 21, 2019

(87) PCT Pub. No.: WO2018/210010
PCT Pub. Date: Nov. 22, 2018

(65) Prior Publication Data
US 2020/0052412 A1 Feb. 13, 2020

(30) Foreign Application Priority Data
May 16, 2017 (CN) .......................... 201710346582.2

(51) Int. Cl.
*H01Q 21/00* (2006.01)
*G06N 3/12* (2006.01)
(52) U.S. Cl.
CPC ............. *H01Q 21/00* (2013.01); *G06N 3/126* (2013.01)

(58) Field of Classification Search
CPC ............ G06N 3/12; H01Q 21/00; H01Q 21/06
See application file for complete search history.

(56) References Cited

U.S. PATENT DOCUMENTS 7,092,690 B2 * 8/2006 Zancewicz ........... H01Q 3/2605
342/368
7,502,764 B2 * 3/2009 Son ......................... H01Q 3/30
706/13

(Continued)

FOREIGN PATENT DOCUMENTS

| CN | 103188695 | 7/2013 |
| CN | 104020448 | 9/2014 |

(Continued)

OTHER PUBLICATIONS

"International Search Report (Form PCT/ISA/210) of PCT/JP2018/075150," dated May 9, 2018, with English translation thereof, pp. 1-6.

(Continued)

*Primary Examiner* — Hasan Z Islam
(74) *Attorney, Agent, or Firm* — JCIPRNET

(57) ABSTRACT

A method for array elements arrangement of an L-shaped array antenna based on inheritance of acquired character. The method relates to the field of array elements design for L-shaped array antenna. In order to solve the problem that the arrangement of the current L-shaped array antenna system has a weak local ability, the invention firstly encodes for the J_K array, then calculates a fitness of each chromosome in the population, randomly selects two parent chromosomes according to a overwriting probability of inheritance of acquired character, calculates a percentage of gene delivery, performs a overwriting operation to generate a new population, repeats the overwriting operation to generate the final new population; calculates the fitness of each chromosome in the population, repeats the iteration until a prede- (Continued)

termined termination condition is met, and obtains the optimal population gene; then determines the array elements arrangement of the L-shaped array antenna according to the optimal population gene.

6 Claims, 2 Drawing Sheets

(56) References Cited

U.S. PATENT DOCUMENTS

| | | | |
|---|---|---|---|
| 9,148,839 B2* | 9/2015 | Hejazi | H04W 28/08 |
| 2006/0224527 A1 | 10/2006 | Straatveit | |

FOREIGN PATENT DOCUMENTS

| | | |
|---|---|---|
| CN | 104992000 | 10/2015 |
| CN | 106407549 | 2/2017 |
| CN | 107275801 | 10/2017 |
| JP | 2001024421 | 1/2001 |
| JP | 2002164736 | 6/2002 |

OTHER PUBLICATIONS

Guo et al., "Geometry Design of Two-dimensional Non-filled Array for Multimode Separation in Skywave Radar," Systems Engineering and Electronics, vol. 38, Issue 9, Sep. 30, 2016, pp. 2033-2039.

Cao, Shunfeng,"Study on Antenna Array Pattern Novel Fast Synthesis Method", Thesis of Doctor Degree, Xidian University, Apr. 2016, pp. 1-152.

Wang, Guangpeng, "Study on Optimization Design Algorithm of Circular Aperture Plane Antenna Array", Thesis of Master Degree, University of Electronic Science and Technology of China, May 2012, pp. 1-75.

Wei, Xiaokun et al., "Improved Self-adaptive Genetic Algorithm with Quantum Scheme for Electromagnetic Optimisation," IET Microwaves. Antennas & Propagation, vol. 8, Issue 12, Sep. 16, 2014, pp. 965-972.

Yang, Xuesong et al., "Ultra-Wideband Planar Antenna Optimized by a Multi-Objective Evolutionary Algorithm, " Proceedings of Asia-Pacific Microwave Conference, Dec. 14, 2007, pp. 1-4.

Li, Lin et al., "Using Genetic Algorithms and Monte Carto to Price Convertible Bond," 2010 2nd IEEE International Conference on Information and Financial Engineering, Sep. 17, 2010, pp. 369-372.

* cited by examiner

METHOD FOR ARRAY ELEMENTS ARRANGEMENT OF L-SHAPED ARRAY ANTENNA BASED ON INHERITANCE OF ACQUIRED CHARACTER

CROSS-REFERENCE TO RELATED APPLICATION

This is a 371 application of the International PCT application serial no. PCT/CN2018/075150, filed on Feb. 2, 2018, which claims the priority benefits of China Application No. 201710346582.2, filed on May 16, 2017. The entirety of each of the above-mentioned patent applications is hereby incorporated by reference herein and made a part of this specification.

TECHNICAL FIELD

The invention relates to the field of array elements design for L-shaped array antenna.

BACKGROUND

In recent years, artificial intelligence optimization systems and array antenna technologies have been rapidly developed. However, due to the limitations of array elements arrangement optimizers of array antennas, linear array angle measurement has its limitations, that is, only one-dimensional angle information can usually be obtained. Due to advantages of the L-shaped array antenna, such as the simple structure and good layout effect and so on, the L-shaped array antenna has become a hot topic of application. However, the L-shaped array has a serious problem. Compared with the uniform rectangular two-dimensional array, the L-shaped array has relative poor performance in using its direct beam to form pattern. Due to the small number of array elements, its angle measurement resolution and angle measurement accuracy need to be optimized. Therefore, the optimized placement of the L-shaped array is important for the beam forming and the availability of beam patterns. By optimizing the arrangement of the L-shaped array, the L-shaped array's advantages of simple structure and small number of array elements can be further enhanced, and the disadvantage of the L-shaped array can be minimized, that is, the performance of the beam to form pattern is optimized.

Harbin Institute of Technology made great progress in the study of performance beam to form pattern. The title of the application is "method for beam forming and beam pattern optimization based on an L-shaped array antenna (application number 201510341877.1)". The array has been optimized several times in this patent, which greatly improves the angle measurement resolution and the angle measurement accuracy of the beam pattern. However, it only uses the traditional genetic algorithm to optimize the L-shaped array elements arrangement, and the traditional genetic algorithm has the disadvantages such as slow convergence speed, weak local search ability, tendency of premature and so on, thus the array elements arrangement of the L-shaped array cannot achieve fast and optimal results, which in turn leads to failure in exerting stable effects or optimal effects of its beam forming and beam pattern optimization method. Therefore, method and system for array elements arrangement of the L-shaped array antenna need to be improved or perfected.

In order to improve the overall optimization ability and local optimization ability of the optimization algorithm, most of the current solutions choose to combine two algorithms, such as combining genetic algorithm and annealing algorithm. Although a relatively good result can be achieved by using two or more algorithms for optimization. This solution has a large amount of calculation, relatively slow optimization and other problems, and the global search ability and local search ability need to be further improved.

SUMMARY OF THE INVENTION

In order to solve the problem that the arrangement of the current L-shaped array antenna system has a weak local ability, the present invention provides a method for array elements arrangement of an L-shaped array antenna based on inheritance of acquired character.

A method for array elements arrangement of an L-shaped array antenna based on inheritance of acquired character, comprises steps of:

removing array elements of central parts of a rectangular array antenna, and only preserving two columns of array elements of an adjacent boundary to obtain an array basic structure, i.e., an L-shaped array antenna;

step 1: a J_K array being the array with two columns of array elements of the adjacent boundary of the L-shaped array antenna, numbers of the two columns of array elements being J and K respectively, encoding for the J_K array:

using the J_K array as one chromosome, when forming an gene of an individual, using J+K groups of binary strings randomly generated to represent the J_K array, a number of bits of a binary digit string is Na, and calling each binary string as one gene of the chromosome; the meaning that each binary represents being an array element spacing between the array element and the previous array element, and using the above method to generate J+K genes as an initial population of a genetic algorithm for preservation;

in order to facilitate the representation, using d to represent a total number J+K of the genes in the chromosome, there being d=J+K; at this time, denoting each chromosome as $P_k^i$, an gene string of $P_k^i$ constituting $\{x_k^1(i), x_k^2(i), \ldots, x_k^d(i)\}$ which is represented as $P_k^i=\{X_k^j(i), i=1, \ldots, N_G, j=1, \ldots d\}$; wherein $x_k^j(i)$ represents the gene and j represents a sequence number of the gene in the chromosome; the population $G_k=\{P_k^i, i=i1, 2, \ldots, N_G\}$; wherein k is an algebra of population evolution; i represents a sequence number of the chromosome in the population; and $N_G$ represents a size of the population and is an even number;

step 2: performing one adjustment of the initial population $G_k$; then calculating a fitness of each chromosome $P_k^i$ in the population $G_k$;

step 3: performing an overwriting operation to generate a new population $G_{k+1}$':

step 3.1: randomly selecting two parent chromosomes $P_k^{i_1}$ and $P_k^{i_2}$, and $P_k^{i_1}=\{x_k^1(i_1), x_k^2(i_1), \ldots, x_k^j(i_1)\}_{j=1}^d$, $P_k^{i_2}=\{x_k^1(i_2), x_k^2(i_2), \ldots, x_k^j(i_2)\}_{j=1}^d$, according to an overwriting probability ρ of inheritance of acquired character, wherein $\rho \in (0,1]$;

step 3.2: comparing a fitness function value $f(P_k^{i_1})$ of the parent chromosome $P_k^{i_1}$ with the fitness function value $f(P_k^{i_2})$ of the parent chromosome $P_k^{i_2}$, selecting the chromosome with the large fitness function value, assuming that $f(P_k^{i_1}) > f(P_k^{i_2})$, then calculating a percentage $p_t$ of gene delivery:

$$p_t = \left( \frac{f(P_k^{j_1})}{f(P_k^{j_1}) + f(P_k^{j_2})} \right),$$

and then calculating a number $n_t$ of the genes delivered according to the following formula:

$$n_t = d \times p_t$$

wherein d is the total number of genes in the chromosome.

step 3.3: performing the overwriting operation:

firstly, denoting the chromosome with strong fitness as $P_k^{i_1"}$, preserving $P_k^{i_1"}$ as k+1 generation of chromosome $P_{k+1}^{i_1"}$; denoting the chromosome with weak fitness as $P_k^{i_2"}$;

secondly, delivering $n_t$ genes from the chromosome $P_k^{i_1"}$ with strong fitness to the chromosome $P_k^{i_2"}$ with weak fitness to form new weak chromosome $\check{P}P_k^{i_2}$, wherein positions of the delivered genes are randomly selected;

using $\check{P}P_k^{i_2}$ as k+1 generation of chromosome $P_{k+1}^{i_2}$;

step 3.4: repeating steps 3.1 to 3.3 $N_G$ times, generating the final new population $G'_{k\pm 1}$ after the overwriting operation;

step 4: performing a mutation operation, generating the new population $G_{k+1}$ after one optimization operation;

step 5: calculating the fitness of each chromosome $P_{k+}^i$ in the population $G_{k+1}$, repeating the iteration from steps 3 to 4 until a predetermined termination condition is met to obtain the optimal population gene; then determining the array elements arrangement of the L-shaped array antenna according to the optimal population gene.

Preferably, the process of performing the mutation operation in step 4 is performed by using a uniform mutation method, and a mutation probability is $p_m$; then generating the new population $G_{k+1}$ after one optimization operation.

Preferably, the adjustment process in one adjustment of the initial population performed in step 2 is as follows:

firstly, converting each generation of J+K binary strings into decimal digits, a value of the decimal digits converted by the binary strings correspondingly representing the array element spacing between the array element and the previous array element, i.e., obtaining the array element spacing D after the binary strings are restored;

when calculating positions of the previous J array elements, generating and counting each array element spacing D, and cumulatively calculating a value of an overall aperture, if the cumulative value of the array element spacing D being to exceed the maximum aperture Da of the array, then mandatorily adjusting each array element spacing of the subsequent array elements to be 1;

the adjustment method for the subsequent K array elements being the same as that for the previous J array elements.

Preferably, the formula that the binary strings are converted by the adjustment into the decimal digits is as follows:

$$D = \left| \frac{N7}{2^{Na} - 1} \right| * Da$$

wherein N7 represents binary strings; |•| represents rounding; and Da is the maximum aperture of the array. The maximum aperture Da of the array is 55.

Preferably, one adjustment of the population $G_{k+1}$ is performed in step 4 after generating the new population $G_{k+1}$ after one optimization operation, and the adjustment process is the same as the adjustment process in step 2.

The invention has the following beneficial effects:

The genetic algorithm used in the array elements arrangement process of the L-shaped array antenna can maximize the local search ability based on the existing genetic algorithm, and avoids the problem that the traditional genetic algorithm falls into the local optimum and the slow evolution in later period. Furthermore, the overwriting operation based on the principle of inheritance of acquired character designed by the present invention replaces the selection and cross operation of the traditional genetic algorithm. Compared with the traditional genetic algorithm and the improved genetic algorithm, the present invention can not only improve the convergence speed and accuracy of the optimal solution set, but also has a simple structure in the optimization process, less control parameters and low computational complexity.

The algorithm of inheritance of acquired character of the present invention can simplify the genetic algorithm, improve the speed and efficiency; meanwhile it can also improve the effect of array elements arrangement of the L-shaped array antenna. If the hybrid optimization algorithm obtained by combining any two existing intelligent optimization algorithms is used for the array elements arrangement of the L-shaped array antenna, compared with this solution, the present invention can also improve the optimization speed and improve the efficiency of the array elements arrangement of the L-shaped array antenna, and is more beneficial to the real-time and adaptive arrangement of the array elements of the L-shaped array antenna. Using the method for array elements arrangement of the L-shaped array antenna to arrange the array elements and combining with the solution of "method for beam forming and beam pattern optimization based on an L-shaped array antenna (application number 201510341877.1)" to perform beam forming and beam pattern optimization, the effects of beam forming and beam pattern optimization can be further improved, on the basis of "method for beam forming and beam pattern optimization based on an L-shaped array antenna".

DETAILED DESCRIPTION OF THE PREFERRED EMBODIMENT

Figure 1:
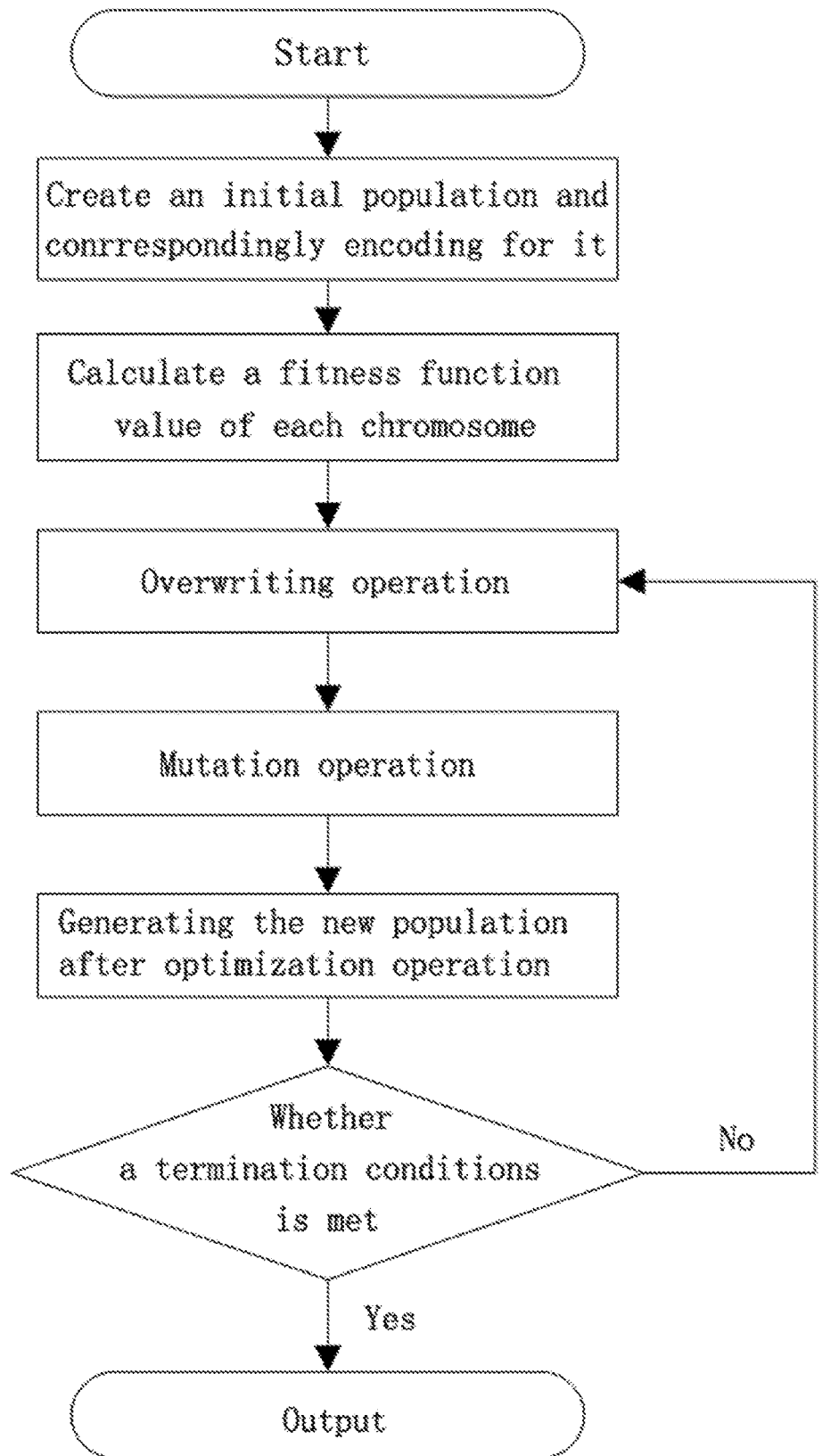
FIG. 1 shows an optimization process of inheritance of acquired character of array elements arrangement of an L-shaped array antenna.

Embodiment 1 the present embodiment will be described with reference to FIG. 1.

Figure 2:
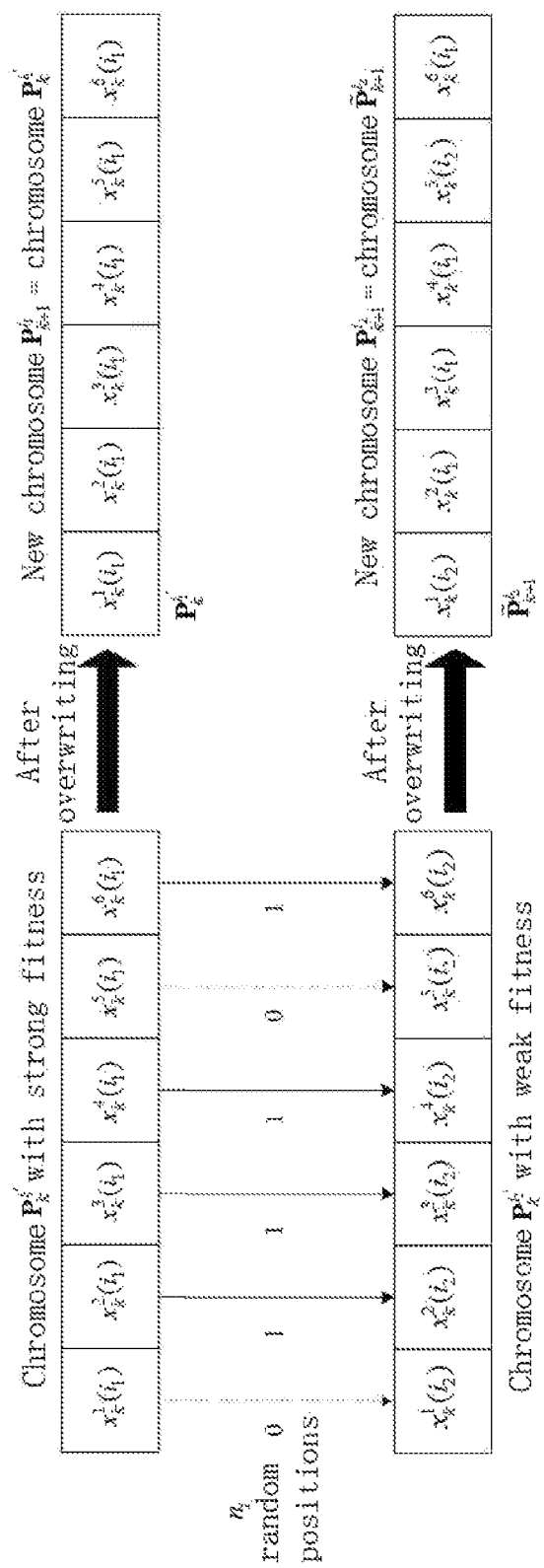
FIG. 2 shows an overwriting operation of the optimization of inheritance of acquired character.

A method for array elements arrangement of an L-shaped array antenna based on inheritance of acquired character, comprises steps of:

removing array elements of central parts of a rectangular array antenna, and only preserving two columns of array elements of an adjacent boundary to obtain an array basic structure, i.e., an L-shaped array antenna;

step 1: a J_K array being the array with two columns of array elements of the adjacent boundary of the L-shaped array antenna, numbers of the two columns of array elements being J and K respectively, encoding for the J_K array:

using the J_K array as one chromosome, when forming an gene of an individual, using J+K groups of binary strings randomly generated to represent the J_K array, a number of bits of a binary digit string is Na, and using each binary string as one gene of the chromosome; the meaning that each binary represents being an array element spacing between the array element and the previous array element, and using the above method to generate J+K genes as an initial population of a genetic algorithm for preservation;

in order to facilitate the representation, using d to represent a total number J+K of the genes in the chromosome, there being d=J+K; at this time, denoting each chromosome as $P_k^i$, an gene string of $P_k^i$ constituting $\{x_k^1(i), x_k^2(i), \ldots, x_k^d(i)\}$, which is represented as $P_k^i=\{x_k^j(i), i=1, \ldots, N_G, j=1, \ldots d\}$; wherein $x_k^j(i)$ represents the gene (each binary string), and j represents a sequence number of the gene in the chromosome; the population $G_k=\{P_k^i, i=1, 2 \ldots, N_G\}$; wherein k is an algebra of population evolution; i represents a sequence number of the chromosome in the population; and $N_G$ represents a size of the population and is an even number;

step 2: performing one adjustment of the initial population $G_k$; then calculating a fitness of each chromosome $P_k^i$ in the population $G_k$;

step 3: performing an overwriting operation to generate a new population $C_{k+1}'$:

step 3.1: randomly selecting two parent chromosomes $P_k^{i1}$ and $P_k^{i2}$, and $P_k^{i1}=\{x_k^1(i_1), x_k^2(i_1), \ldots x_k^j(i_1)\}_{j=1}^{d}$, $P_k^{i2}=\{x_k^1(i_2), X_k^2(i_2), \ldots x_k^j(i_2)\}_{j=1}^{d}$, according to an overwriting probability ρ of inheritance of acquired character, wherein ρ∈(0,1];

step 3.2: comparing a fitness function value $f(P_k^{i1})$ of the parent chromosome $P_k^{i1}$ with the fitness function value $f(P_k^{i2})$ of the parent chromosome $P_k^{i2}$, selecting the chromosome with the large fitness function value, assuming that $f(P_k^{i1})>f(P_k^{i2})$, then calculating a percentage $p_t$ of gene delivery:

$$p_t = \left( \frac{f(P_k^{i1})}{f(P_k^{i1}) + f(P_k^{i2})} \right).$$

and then calculating a number $n_t$ of the genes delivered according to the following formula:

$n_t = d \times p_t$ wherein d is the total number of genes in the chromosome;

step 3.3: performing the overwriting operation:

firstly, denoting the chromosome with strong fitness as $P_k^{i1"}$, preserving $P_k^{i1"}$ as k+1 generation of chromosome $P_{k+1}^{i1}$; denoting the chromosome with weak fitness as $P_k^{i2"}$;

secondly, delivering $n_t$ genes from the chromosome $P_k^{i1"}$ with strong fitness to the chromosome $P_k^{i2"}$ with weak fitness to form new weak chromosome $\tilde{P}P_k^{i2}$, wherein positions of the delivered genes are randomly selected; as shown in FIG. 2, assuming that the delivered genes are the second, third, fourth, and sixth genes, then the new weak chromosome being $\tilde{P}P_k^{i2}=\{x_k^1(i_1), x_k^2(i_2), x_k^3(i_1), x_k^4(i_2), x_k^5(i_1) \ldots x_k^j(i_2)\}_{j=1}^{d}$ after overwriting operation.

using $\tilde{P}_k^{i2}$ as k+1 generation of chromosome $P_{k+1}^{i2}$;

step 3.4: repeating steps 3.1 to 3.3 $N_G$ times, generating the final new population $G_{k+1}'$ after the overwriting operation;

step 4: performing a mutation operation, generating the new population $G_{k+1}$ after one optimization operation;

step 5: calculating the fitness of each chromosome $P_{k+1}^i$ in the population $G_{k+1}$, repeating the iteration from steps 3 to 4 until a predetermined termination condition is met to obtain the optimal population gene; then determining the array elements arrangement of the L-shaped array antenna according to the optimal population gene.

Embodiment 2

In present embodiment, the process of performing the mutation operation in step 4 is performed by using a uniform mutation method, and a mutation probability is $p_m$; then generating the new population $G_{k+1}$ after one optimization operation.

The other steps and parameters are the same as those in embodiment 1.

Embodiment 3

In present embodiment, the adjustment process in one adjustment of the initial population performed in step 2 is as follows:

firstly, converting each generation of J+K binary strings into decimal digits, a value of the decimal digits converted by the binary strings correspondingly representing the array element spacing between the array element and the previous array element, i.e., obtaining the array element spacing D after the binary strings are restored;

when calculating positions of the previous J array elements, generating and counting each array element spacing D, and cumulatively calculating a value of an overall aperture, if the cumulative value of the array element spacing D being to exceed the maximum aperture Da of the array, then mandatorily adjusting each array element spacing of the subsequent array elements to be 1;

the adjustment method for the subsequent K array elements being the same as that for the previous J array elements.

The other steps and parameters are the same as those in embodiment 1 or 2.

Embodiment 4

In present embodiment, the formula that the binary strings are converted by the adjustment into the decimal digits is as follows:

$$D = \left\lfloor \frac{N7}{2^{Na}-1} \right\rfloor * Da$$

wherein N7 represents binary strings; |•| represents rounding; and Da is the maximum aperture of the array.

The maximum aperture Da of the array is 55.

Due to the characteristics of the L-shaped array antenna and the limitation of the genetic optimization algorithm, the maximum aperture Da of the array is generally not configured to be too large. As the method for array elements arrangement of the L-shaped array antenna based on inheritance of acquired character of the present invention can improve the convergence speed and accuracy of the optimal solution set, the maximum aperture of the array can be appropriately increased in the case where the optimization effect of the present invention is almost the same with that of the "method for beam forming and beam pattern optimization based on an L-shaped array antenna" and under the condition that the L-shaped array antenna's own characteristics is not changed.

The other steps and parameters are the same as those in embodiment 3.

Embodiment 5

In present embodiment, one adjustment of the population $G_{k+1}$ is performed in step 4 after generating the new population $G_{k+1}$ after one optimization operation, and the adjustment process is the same as the adjustment process in step 2.

The other steps and parameters are the same as those in embodiment 4.

What is claimed:

1. A method for array elements arrangement of an L-shaped array antenna based on an inheritance of an acquired character, the method comprises:
   step 1: a J_K array being an array with two columns of array elements of an adjacent boundary of the L-shaped array antenna, numbers of the two columns of array elements being J and K respectively; encoding for the J_K array:
   using the J_K array as one chromosome, when forming a gene of an individual, using J+K groups of binary strings randomly generated to represent the J_K array, a number of bits of a binary digit string being Na, and using each binary digit string as one gene of the chromosome; meaning that each binary represents an array element spacing between the array element and a previous array element, and using the above method to generate J+K genes as an initial population of a genetic algorithm for preservation;
   in order to facilitate the representation, using d to represent a total number J+K of the genes in the chromosome, there being d=J+K; at this time, denoting each chromosome as $P_k^i$, a gene string of $P_k^i$ constituting $\{x_k^1(i), x_k^2(i), \ldots, x_k^d(i)\}$, which is represented as $P_k^i=\{x_k^j(i), i=1, \ldots, N_G, j=1, \ldots d\}$; wherein $x_k^j(i)$ represents the gene and j represents a sequence number of the gene in the chromosome; the population $G_k=\{P_k^i, i=1, 2 \ldots N_G\}$; wherein k is an algebra of population evolution; i represents a sequence number of the chromosome in the population; and $N_G$ represents a size of the population and is an even number;
   step 2: performing one adjustment of the initial population; then calculating a fitness of each chromosome $P_k^i$ in the population $G_k$;
   step 3: performing an overwriting operation to generate a new population $G_{k+1}$':
   step 3.1: randomly selecting two parent chromosome $P_k^{i1}$ and $P_k^{i2}$ and $P_k^{i1}=\{x_k^1(i_1), x_k^2(i_1), \ldots x_k^i(i_1)\}_{j-1}^d$, $P_k^{i1}=\{x_k^1(i_2), x_k^2(i_2), \ldots x_k^1(i_2)\}_{j-1}^d$, according to an overwriting probability ρ of the inheritance of the acquired character, wherein ρ∈(0,1];
   step 3.2: comparing a first fitness function value $f(P_k^i)$ of the parent chromosome $P_k^{i1}$ with a second fitness function value $f(P_k^i)$ of the parent chromosome $P_k^{i2}$, selecting a chromosome with a large fitness function value, assuming that $f(P_k^{i1})>f(P_k^{i2})$,
   then calculating a percentage $p_i$ or gene delivery:

$$p_t = \left(\frac{f(P_k^{j1})}{f(P_k^{j1})+f(P_k^{j2})}\right),$$

and then calculating a number $n_i$ of the genes delivered according to the following formula:

$$n_i = d \times p_i$$

wherein d is a total number of genes in the chromosome;
   step 3.3: performing the overwriting operation:
   firstly, denoting a chromosome with strong fitness as $P_k^{i1\prime}$, preserving $P_k^{i1\prime}$ as k+1 generation of chromosome $P_{k+1}^{i1\prime}$; denoting a chromosome with weak fitness as $P_k^{i2\prime}$;
   secondly, delivering a genes from the chromosome with strong fitness $P_k^{i1\prime}$ to the chromosome with weak fitness $P_k^{i1\prime}$ to form new weak chromosome $\tilde{P}_k^{i1}$, wherein positions of the delivered genes a randomly selected: using $\tilde{P}_k^{i1}$ as k+1 generation of chromosome $P_{k+1}^{i1}$;
   step 3.4: repeating steps 3.1 to 3.3 $N_G$ times, generating a final new population $G_{k+1}$' after the overwriting operation;
   step 4: performing a mutation operation, generating a new population $G_{k+1}$ ater one optimization operation;
   step 5: calculating the fitness of each chromosome $P_{k+1}^i$ in the population $G_{k+1}$, repeating the iteration from steps 3 to 4 until a predetermined termination condition is met to obtain an optimal population gene; then determining the array elements arrangement of the L-shaped array antenna according to the optimal population gene.

2. The method for the array elements arrangement of the L-shaped array antenna based on the inheritance of the acquired character according to claim 1, wherein the process of performing the mutation operation in step 4 is performed by using a uniform mutation method, and a mutation probability is $p_m$; then generating the new population $G_{k+1}$ after one optimization operation.

3. The method for the array elements arrangement of the L-shaped array antenna based on the inheritance of the acquired character according to claim 2, wherein the adjustment process in one adjustment of the initial population performed in step 2 is as follows:
   firstly, converting each generation of J+K binary strings into decimal digits, a value of the decimal digits converted by the binary strings correspondingly representing the array element spacing between the array element and the previous array element, i.e., obtaining the array element spacing D after the binary strings are restored;
   when calculating positions of the previous J array elements, generating and counting each array element spacing D, and cumulatively calculating a value of an overall aperture, if the cumulative value of the array element spacing D exceeds a maximum aperture Da of the array, then mandatorily adjusting each array element spacing of the subsequent array elements to 1;
   the adjustment method for the subsequent K array elements being the same as that for the previous J array elements.

4. The method for the array elements arrangement of the L-shaped array antenna based on the inheritance of the acquired character according to claim 3, wherein the maximum aperture Da of the array is 55.

5. The method for the array elements arrangement of the L-shaped array antenna based on the inheritance of the acquired character according to claim 3, wherein one adjustment of the population $G_{k+1}$ is performed in step 4 after generating the new population $G_{k+1}$ after one optimization operation, and the adjustment process is the same as the adjustment process in step 2.

6. The method for the array elements arrangement of the L-shaped array antenna based on the inheritance of the acquired character according to claim 4, wherein one adjustment of the population $G_{k+1}$ is performed in step 4 after generating the new population $G_{k+1}$ after one optimization operation, and the adjustment process is the same as the adjustment process in step 2.

* * * * *